July 11, 1972  N. G. SCHREWELIUS  3,676,093
FURNACE FOR THE PRODUCTION OF GLASS FIBERS
Filed Sept. 2, 1970  3 Sheets-Sheet 3
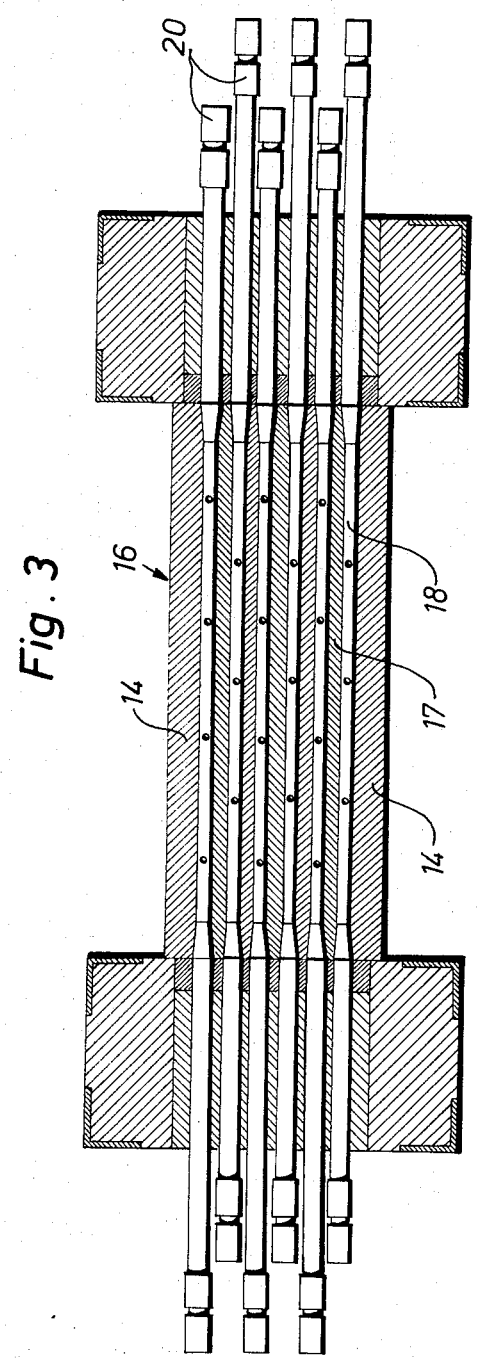
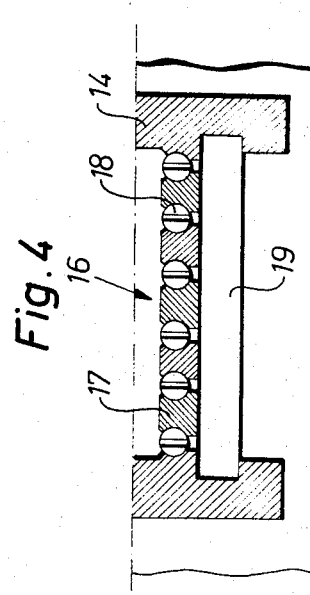
INVENTOR.
NILS GUSTAV SCHREWELIUS 3,676,093
Patented July 11, 1972

3,676,093
FURNACE FOR THE PRODUCTION OF GLASS FIBERS

Nils Gustav Schrewelius, Hallstahammar, Sweden, assignor to Aktiebolaget Kanthal, Hallstahammar, Sweden
Filed Sept. 2, 1970, Ser. No. 68,986
Claims priority, application Sweden, Sept. 3, 1969, 12,189/69
Int. Cl. C03b 37/02
U.S. Cl. 65—1        8 Claims

ABSTRACT OF THE DISCLOSURE

In a furnace for use in the production of glass fibers at least a portion of the bottom wall of a compartment for molten glass is formed by one or more rods consisting essentially of molybdenum disilicide and having transverse through bores forming outlets for the molten glass. The rods may be heated by passing current through them.

---

This invention relates to a furnace for use in the production of glass fibers.

In a known method of producing glass fibers a platinum trough is used which is charged with the glass from which the glass fibers are to be made. The bottom of the trough is provided with a plurality of bores having a diameter of the order of two millimeters, and when the trough is heated to high temperature, the glass flows through the bores. Preferably, the trough is heated by passing current through it. As will be appreciated, the trough, having a length of one or two feet, a width of about four inches and a vertical dimension of about four inches, or slightly more, is extremely expensive. Even though the trough is made of platinum, it is subject to corrosion so that its life is limited. Thus, the trough must be replaced or remelted, usually at intervals of about six months.

It has been proposed to make at least the bottom of the trough from a plate or slab of molybdenum disilicide having a plurality of through bores forming the outlets for the molten glass. It is extremely difficult, however, to make such a slab of molybdenum disilicide, and in case the slab is heated by passing current through it, it is practically impossible to control the current flow through different sections of it. Moreover, for technical reasons such a slab has to be relatively thick, thus requiring enormous currents for the heating. Another difficult problem connected with the high heating currents is caused by the electrical connectors, since the current density is so high as to render the electrotechnical problems almost impossible to overcome. Besides, the material can hardly endure the unavoidable temperature gradients.

An object of the invention is to provide a furnace in which above problems are substantially eliminated.

The invention consists in the features of construction, combination of elements and arrangement of parts hereinafter described and claimed, and illustrated in the accompanying drawings, in which:

FIG. 3 is a plan view of the bottom wall of the furnace, partly in section along line III—III in FIG. 1;

FIG. 4 is an enlarged fragmentary sectional view corresponding to the lower portion of FIG. 1.

Figure 1:
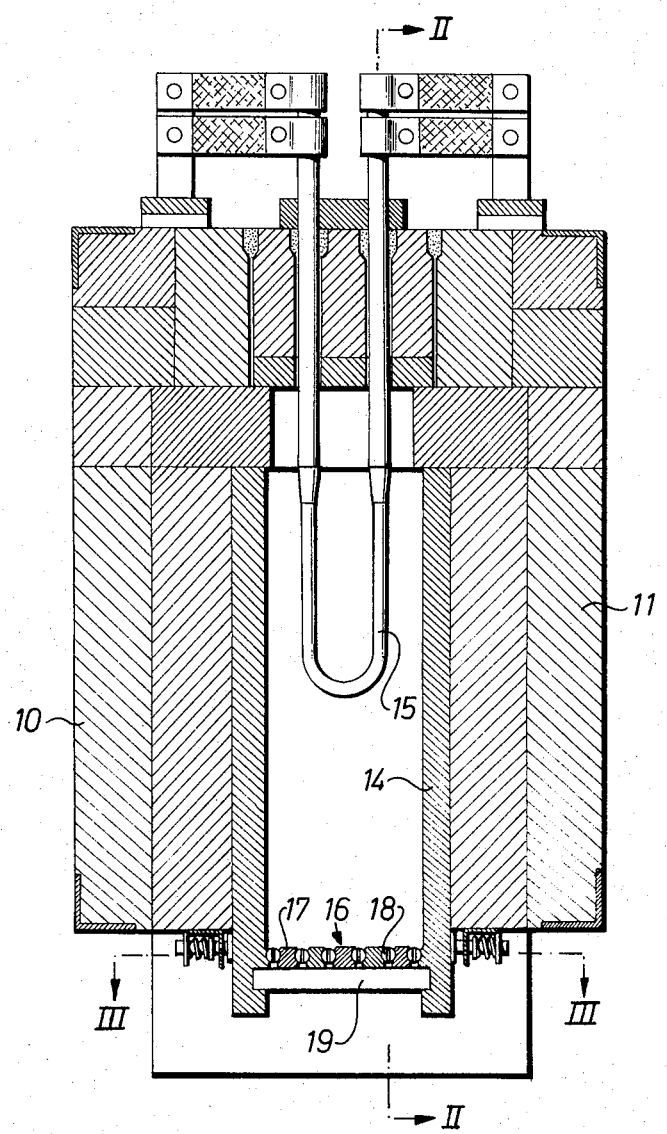
FIG. 1 shows, by way of example, a vertical section through an embodiment of a furnace constructed in accordance with the invention.
Figure 2:
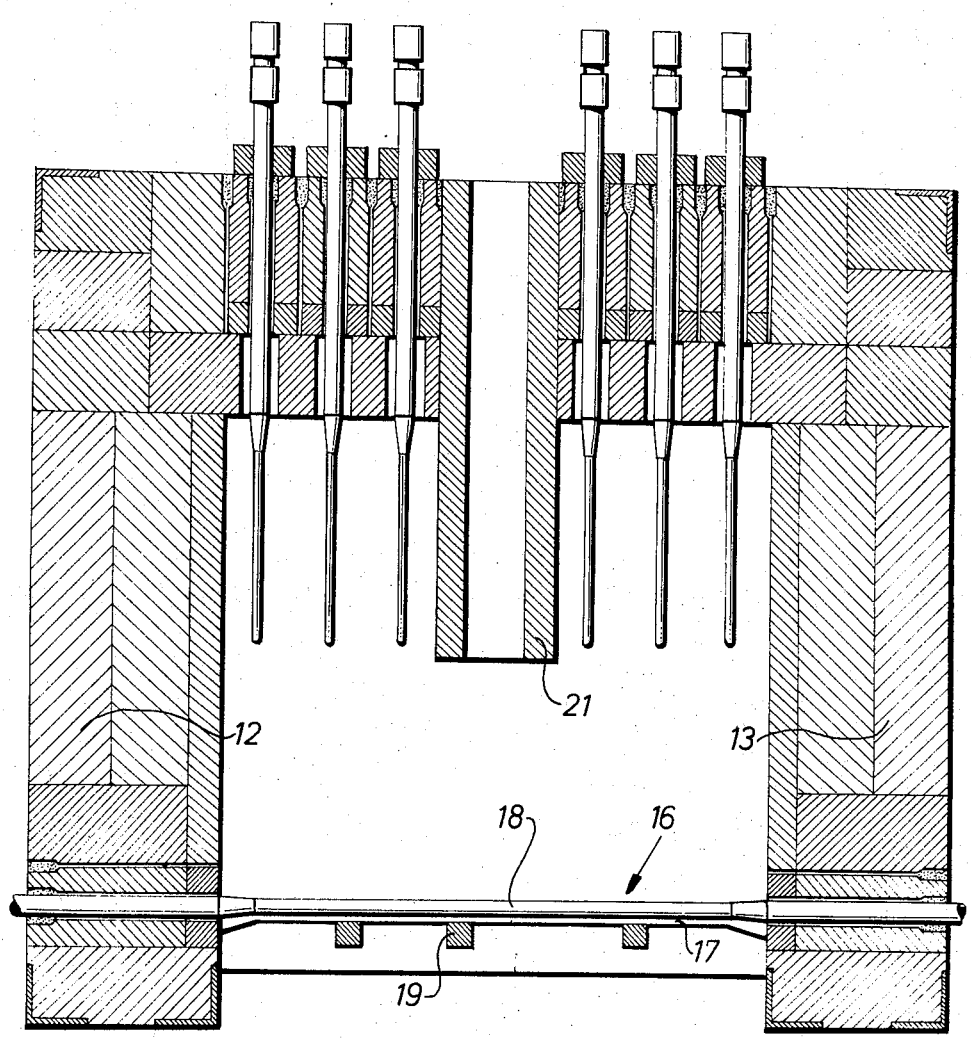
FIG. 2 is a view in vertical section along line II—II in FIG. 1.

With reference to the drawings, there is shown a furnace having side walls 10, 11 and end walls 12, 13 defining a compartment for the glass. The inner surfaces of the walls are lined with a material that is resistant to the furnace atmosphere and the molten glass in the compartment. The lining may consist of zirconium silicate or zirconium-aluminum silicate. From the top of the furnace there are suspended heating elements 15 of the type sold under the registered trademark Kanthal Super, that is heating elements consisting essentially of molybdenum disilicide. The heating elements are U-shaped and preferably are replaceably mounted in the top wall of the furnace compartments.

The bottom wall of the furnace compartment is generally designated 16 and comprises an assembly of preferably profiled holding bars 17, consisting of zirconium silicate or zirconium aluminum silicate, for example, and rods 18 supported by the bars 17. The rods 18, in the embodiment shown, are circular in cross-section and consists essentially of molybdenum disilicide, $MoSi_2$. Each rod 18 is provided with one or more transverse through bores having a diameter of the order of two millimeters. These bores form outlets for the molten glass in the furnace compartment. The profile of the holding bars 17 is such as to leave the lower openings of the bores unobstructed. In the embodiment shown the bottom wall is supported at several points along the length of the bars 17 and rods 18 by support bars 19 of a heat resistant material, preferably silicon carbide. As best shown in FIG. 3, the rods 18, which are intended to be heated by passing current through them, are provided with suitable connector members 20 for the current supply.

Centrally of the furnace compartment there is provided a feed tube 21 for the raw material which may be glass beads. Preferably the tube 21 is made of the same material as the lining of the furnace compartment.

An important feature of the invention resides in the provision for passing current through the rods of the bottom wall. These rods may be separated from each other electrically as well as physically in several different ways without departing from the scope of the invention.

A chief advantage of the invention resides in the possibility of controlling in a simple manner the individual rods 18 in respect of their temperature. Thus the rods may be individually controlled, whereby the temperature adjacent the bores forming outlets for the molten glass may be controlled as desired. This control may be effected in dependence of, for example, the diameter of the fine jets or streams leaving the bores of the rod or rods.

In the embodiment shown, the rods 18 are circular in cross-section but other cross-sections may be used. Particularly in the case of circular cross-section of the rods 18, the rods may be provided with two or more series of bores in different longitudinal planes which are angularly displaced from one another. If the relative angular displacement of the longitudinal planes is 90°, for example, the theoretical life of the rods 18 is doubled, since the rods may be rotated through 90° for presenting a new series of bores to the molten glass when the first series has been rendered unsuitable for continued use. A relative angular displacement of 120° would mean trebling the theoretical life of the rods 18.

Normally the main portion of the energy required for melting the glass in the furnace compartment should be supplied by means of radiating overhead heating elements as shown in the drawings. In certain application, however, it may be desirable alternatively or additionally to supply a portion of the energy by means of electrodes, preferably of molybdenum disilicide, which should be totally immersed into the molten glass. In this connection it should be noted that the rods 18 may function alternately as resistance heating elements and electrodes. In the first case heat is generated within the rods while in the second case heat is generated in the glass. The required electrical switching operations may be accomplished by means of exterior means which may be automatically controlled.

What is claimed is:

1. A furnace for the production of glass fibers comprising a compartment for molten glass having a bottom wall, said bottom wall comprising at least one rod consisting essentially of molybdenum disilicide and having a plurality of through bores for discharging molten glass from said compartment in the form of fine jets.

2. A furnace as claimed in claim 1 and including means for passing current through the rod.

3. A furnace as claimed in claim 2 in which said rod is electrically connected such that it is in contact with molten glass during operation to act as electrode and resistance heating element.

4. A furnace as claimed in claim 1 in which the bores of said rod are arranged in at least two relatively angularly displaced longitudinal planes through the axis of the rod.

5. A furnace as claimed in claim 1 in which a plurality of said rods are disposed side by side and electrically separated from each other by profiled bars of electrically insulating material.

6. A furnace as claimed in claim 1 and including electrical heating elements for supplying the main portion of the energy required for melting the glass.

7. A furnace as claimed in claim 1 and including electrical heating electrodes for supplying the main portion of the energy required for melting the glass.

8. A furnace as claimed in claim 1, in which transverse support bars of a heat resistant material, preferably silicon carbide, are disposed below the bottom wall.

References Cited

UNITED STATES PATENTS

| | | | |
|---|---|---|---|
| 3,027,331 | 3/1962 | Schrewelius | 252—518 |
| 3,036,017 | 5/1962 | Schrewelius | 252—518 X |
| 3,392,779 | 10/1966 | Tilbrook | 65—374 X |
| 3,573,014 | 3/1971 | Strickland | 65—1 |

S. LEON BASHORE, Primary Examiner

R. L. LINDSAY, JR., Assistant Examiner

U.S. Cl. X.R.

65—12, 374; 252—518

PO-1050
(5/69)

UNITED STATES PATENT OFFICE
CERTIFICATE OF CORRECTION

Patent No. 3,676,093      Dated July 11, 1972

Inventor(s) Nils Gustav Schrewelius

It is certified that error appears in the above-identified patent and that said Letters Patent are hereby corrected as shown below:

Col. 1, line 6, change "Aktiebolaget Kanthal" to -- Bulten-Kanthal Aktiebolag --;
Col. 2, line 9, change "compartments" to -- compartment --;
Col. 2, line 15, change "consists" to -- consist --;
Claim 3, line 3, after "act" insert -- alternately --.

Signed and sealed this 13th day of March 1973.

(SEAL)
Attest:

EDWARD M. FLETCHER, JR.
Attesting Officer

ROBERT GOTTSCHALK
Commissioner of Patents